US008031555B2

(12) United States Patent
Schuster

(10) Patent No.: US 8,031,555 B2
(45) Date of Patent: Oct. 4, 2011

(54) SEISMIC LOCATION AND COMMUNICATION SYSTEM

(75) Inventor: Gerard Schuster, Salt Lake City, UT (US)

(73) Assignee: University of Utah Research Foundation, Salt Lake City, UT (US)

(*) Notice: Subject to any disclaimer, the term of this patent is extended or adjusted under 35 U.S.C. 154(b) by 294 days.

(21) Appl. No.: 12/349,856

(22) Filed: Jan. 7, 2009

(65) Prior Publication Data
US 2009/0207693 A1  Aug. 20, 2009

Related U.S. Application Data

(60) Provisional application No. 61/019,505, filed on Jan. 7, 2008.

(51) Int. Cl.
*G01V 1/00* (2006.01)
(52) U.S. Cl. .......................... 367/38; 181/108; 181/113
(58) Field of Classification Search ............... 367/38, 367/16, 25, 50, 53, 73, 81, 137, 140, 188; 299/1, 10, 12; 703/2; 181/121
See application file for complete search history.

(56) References Cited

U.S. PATENT DOCUMENTS

| | | | |
|---|---|---|---|
| 3,900,878 A | 8/1975 | Tsao | |
| 4,066,992 A | 1/1978 | Buller et al. | |
| 5,093,929 A | 3/1992 | Stolarczyk et al. | |
| 5,301,082 A | 4/1994 | Stolarczyk et al. | |
| 5,696,735 A * | 12/1997 | Krebs | 367/50 |
| 6,512,312 B1 | 1/2003 | Herkenrath et al. | |
| 6,885,918 B2 | 4/2005 | Harmon et al. | |
| 2005/0193818 A1 | 9/2005 | Cobb | |
| 2008/0122634 A1 | 5/2008 | Mardirossian | |
| 2009/0043545 A1 * | 2/2009 | van Manen et al. | 703/2 |
| 2009/0257316 A1 | 10/2009 | Squire et al. | |
| 2009/0316530 A1 | 12/2009 | Bunyard et al. | |
| 2010/0135116 A1 | 6/2010 | Bis et al. | |

FOREIGN PATENT DOCUMENTS

| | | |
|---|---|---|
| JP | 06-294793 | 10/1994 |
| RU | 2402044 | 10/2010 |
| WO | WO 03/044323 | 5/2003 |

* cited by examiner

*Primary Examiner* — Jack Keith
*Assistant Examiner* — Daniel L Murphy
(74) *Attorney, Agent, or Firm* — Thorpe North & Western LLP

(57) ABSTRACT

A method and system for determining the location of miners trapped in an underground mine that includes recording a reference seismic signature for each of a plurality of underground base stations in the mine in advance of an emergency. The reference seismic signatures are created by generating first a seismic signal with a high signal-to-noise ratio at each base station, monitoring the signal with a permanent array of surface seismic sensors, and recording each unique signature on a central computer. In the event of an emergency, trapped miners can generate a second seismic signal at any of the underground base stations which can be easily identified with the central computer by using the pre-recorded reference seismic signature to overcome a weak signal-to-noise ratio.

19 Claims, 4 Drawing Sheets

SEISMIC LOCATION AND COMMUNICATION SYSTEM

RELATED APPLICATIONS

This application claims the benefit of U.S. Provisional Patent Application No. 61/019,505, filed on Jan. 7, 2008, which is incorporated by reference herein in its entirety.

FIELD OF THE INVENTION

The field of the invention relates generally to seismic location systems, and more specifically to seismic location and communication systems for underground mines.

BACKGROUND OF THE INVENTION

Over the past several decades, the U.S. Government, operators of underground mines, and universities have expended considerable effort in improving mine safety. Since the 1970's these activities have included the development of seismic monitoring systems to pinpoint localized seismic events in the mine, such as rockbursts. Similar efforts have been geared toward locating trapped miners in the event of an emergency. Both types of seismic monitoring systems are related, in that they can include interconnected geophones buried near the surface level. The rockburst system generally uses more permanently installed geophones, while the emergency system generally uses portable surface geophones which can be installed and configured in a few hours.

In general, the typically permanently installed rockburst systems apply a limited number of sensors spread out over a wide area, such as over the entire footprint of the mine that can extend for miles in several directions. This widely-spaced, permanent array can provide coarse measurements suitable for monitoring large, noisy, low frequency seismic events, such as rockbursts, and pinpointing the general location of these events in the mine. Unfortunately, the signal-to-noise ratio of smaller man-made seismic events, such as a trapped miner pounding on a roof bolt with a hammer, is much lower. Due to the unique characteristics of the rock strata overlying each mine, the rapid attenuation of the high frequency noise traveling through the rock, and the long distance between sensors, it is difficult to accurately capture these less-powerful man-made seismic vibrations. Furthermore, at present day is it prohibitively expensive to install and maintain a permanent geophone network over a mine extending tens of square miles with enough sensors to accurately pinpoint a man-made seismic signal at any random location in the mine.

In an emergency, portable systems can provide a higher resolution by placing a greater number of geophones directly over the impacted area to improve sensitivity to human-caused events. Although these types of systems are never exact, rescuers can compare the general direction of man-made impact signals generated by trapped miners with a map of the mine to determine an approximate location. The disadvantages of portable systems are obvious, however. Being portable, they must be carried to the accident site and, depending upon the surface terrain, may take hours or days to set up and configure. This is a critical shortcoming in situations where time is of the essence, with trapped miners having limited quantities of air, sustenance and heat. Furthermore, since there is no opportunity to calibrate the system to the specific rock strata overlying the mine, the location solutions are only approximate at best.

What is needed is a seismic monitoring system for locating trapped miners with an improved capability to detect man-made seismic signals without a high number of seismic sensors and where the seismic vibrations emitted by a trapped miner signal-to-noise ratio is poor.

SUMMARY OF THE INVENTION

The present invention provides a method of determining the location of trapped miners by establishing a unique baseline seismic signature caused by man-made impacts at each of a series of underground base stations, and then using the baseline signature to overcome weak signal-to-noise ratios to identify man-made seismic signals generated at any of the base stations in an emergency.

There has thus been outlined, rather broadly, various features of the invention so that the detailed description thereof that follows may be better understood, and so that the present contribution to the art may be better appreciated. Other features of the present invention will become clearer from the following detailed description of the invention, taken with the accompanying claims, or may be learned by the practice of the invention.

Figure 1:
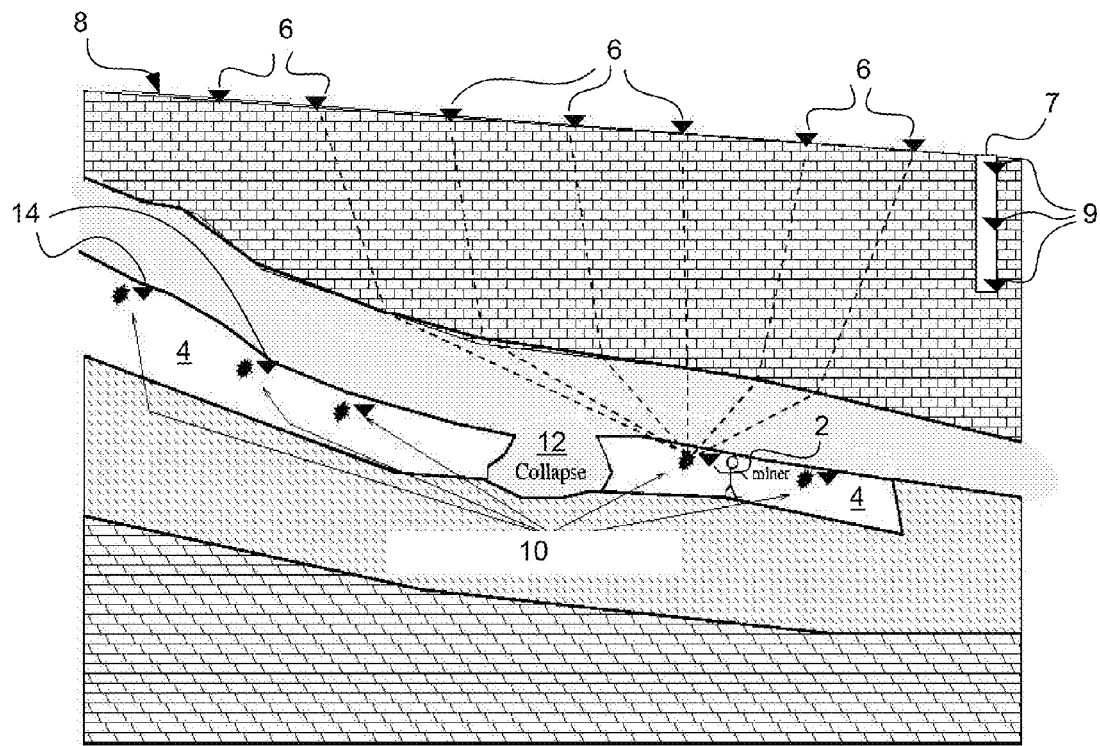
FIG. 1 is a schematic view of a system for determining the location of miners trapped in an underground mine, in accordance with an embodiment of the present invention.

It will be understood that the above figures are merely for illustrative purposes in furthering an understanding of the invention. Further, the figures are not drawn to scale, thus dimensions and other aspects may, and generally are, exaggerated or changed to make illustrations thereof clearer. Therefore, departure can be made from the specific dimensions and aspects shown in the figures in order to practice the present invention.

DETAILED DESCRIPTION

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

It must be noted that, as used in this specification and the appended claims, the singular forms "a," "an," and "the" include plural referents unless the context clearly dictates otherwise. Thus, for example, reference to "a geophone" includes one or more of such devices, reference to "a plate" includes reference to one or more of such members, and reference to "generating" includes reference to one or more of such steps.

As used herein, the term "substantially" refers to the complete or nearly complete extent or degree of an action, characteristic, property, state, structure, item, or result. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, the term "array" refers to an arrangement or layout including more than one sensor. Optionally, the array can be patterned such as an equi-distant placement in one or more directions. Further, the pattern can include offset patterns, or can be patterned in a concentrated manner at points above the underground mine. It should be noted that any pattern, including a random pattern and non-random patterns are contemplated herein.

The phrase "directly above" in relation to an underground mine and the likewise use of the term "directly" refer to positions that are both directly above the mine and relatively close to the point directly above the mine sufficient that the position is functional. Due to the nature of mining, it can be difficult and unnecessarily wasteful of resources to find a point precisely above a mine. As such, points generally above the mine which are functional for the signals discussed herein are considered "directly above", as would be recognized by one skilled in the art. In one embodiment, however, the use of "directly above a mine" indicates precise positioning above a mine.

As used herein, a plurality of components may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

As illustrated in FIG. 1, one exemplary embodiment of a seismic location and communication system for determining the location of miners 2 trapped in an underground mine 4 comprises an array of seismic sensors 6, also known as surface seismic sensors, located proximate to a surface of the earth 8 above the underground mine. As shown, a miner is trapped in the mine by a collapse of earth 12. In the scenario illustrated, the miner can reach two of the base stations 10. Proximate to the surface of the earth can mean both placed on the surface of the earth, as shown in the figure, or buried a short distance below the surface of the earth, which distance can vary from 1 meter to 100 meters, but which is typically in the range from 2 to 10 meters. To increase the signal-to-noise ratio, a well 7 can be drilled at one or several locations and vertical sensors 9 can be located along the well, e.g. within or along walls thereof. The well can be somewhat inexpensive if it is drilled to no more than 30-50 meters in depth. Placing geophones along walls of a cased well can significantly increase the signal-to-noise ratio of recorded traces compared to sensors on the surface by providing a vertical profile to the received signals which can compliment the horizontally placed sensors. The geophones along walls of the well will not be substantially affected by the low velocity high attenuation zone near the ground surface, which will increase the signal-to-noise ratio of these geophones comparing to surface seismic sensors.

Similarly, the geophones can be buried, e.g. ½ to 1 meters, in order to increase the signal-to-noise ratio. Moreover, proximate to the surface of the earth can include an even greater depth below the surface of the earth while still maintaining electrical or mechanical communication with the surface of the earth, such as inside the bore of a well or coupled to a communications cable. In some embodiments, all sensors can be vertical component phones to optimize signal to noise ratio (or "S/N") of the recorded signal.

The array of surface seismic sensors can include any instrument capable of measuring seismic waves, including geophones, seismometers, and accelerographs. The location of each individual surface seismic sensor can be separated from an adjacent sensor by an array spacing distance, which distance can range from tens of meters to a kilometer or more. Spacing can be a function of performance and costs. In one embodiment, spacing can be up to 1 or 2 km and the geophones can be 10-20 Hz, although others such as 40-50 Hz geophones can also be suitable. The array can comprise an individual seismic sensor at each location, or a string of seismic sensors mounted vertically within a well-bore and extended some distance below the surface of the earth to improve sensor sensitivity. The surface seismic sensors can be installed with a communications link to a central computer that has both data processing and data storage capabilities. The communications link can include physical communications cables, as well as wireless technologies such as, but not limited to, optical, infrared and radio emissions.

As shown in FIG. 1, the embodiment can also include a plurality of base stations 10 within the underground mine 4 that are separated from any adjacent base station by a base station spacing distance, ranging from tens of meters to a 100 meters or more. Each base station can include a seismic generator 14 which can be used to generate a seismic vibration or emission, such as a strike plate and hammer or a seismic vibrator.

In another exemplary embodiment, the present invention includes the method of determining the location of miners trapped in an underground mine by first recording a baseline seismic signature caused by a reference seismic signal generated at each of the underground base stations during a non-emergency situation. For instance, during system installation the mine safety officer can generate a reference seismic vibration at any particular underground base station, either by repeatedly striking the strike plate with a hammer, activating a seismic vibrator, or by using some other method for generating a strong seismic vibration. This reference signal or first seismic emission can be monitored by the array of surface seismic sensors and recorded as a reference seismic signature unique to that particular base station, depending upon the position of the base station relative to the surface array of sensors and the underlying rock strata serving as a medium for the seismic waves. The safety officer can then travel throughout the underground mine and record a plurality of reference seismic signature, one for each underground base station.

Figure 3:
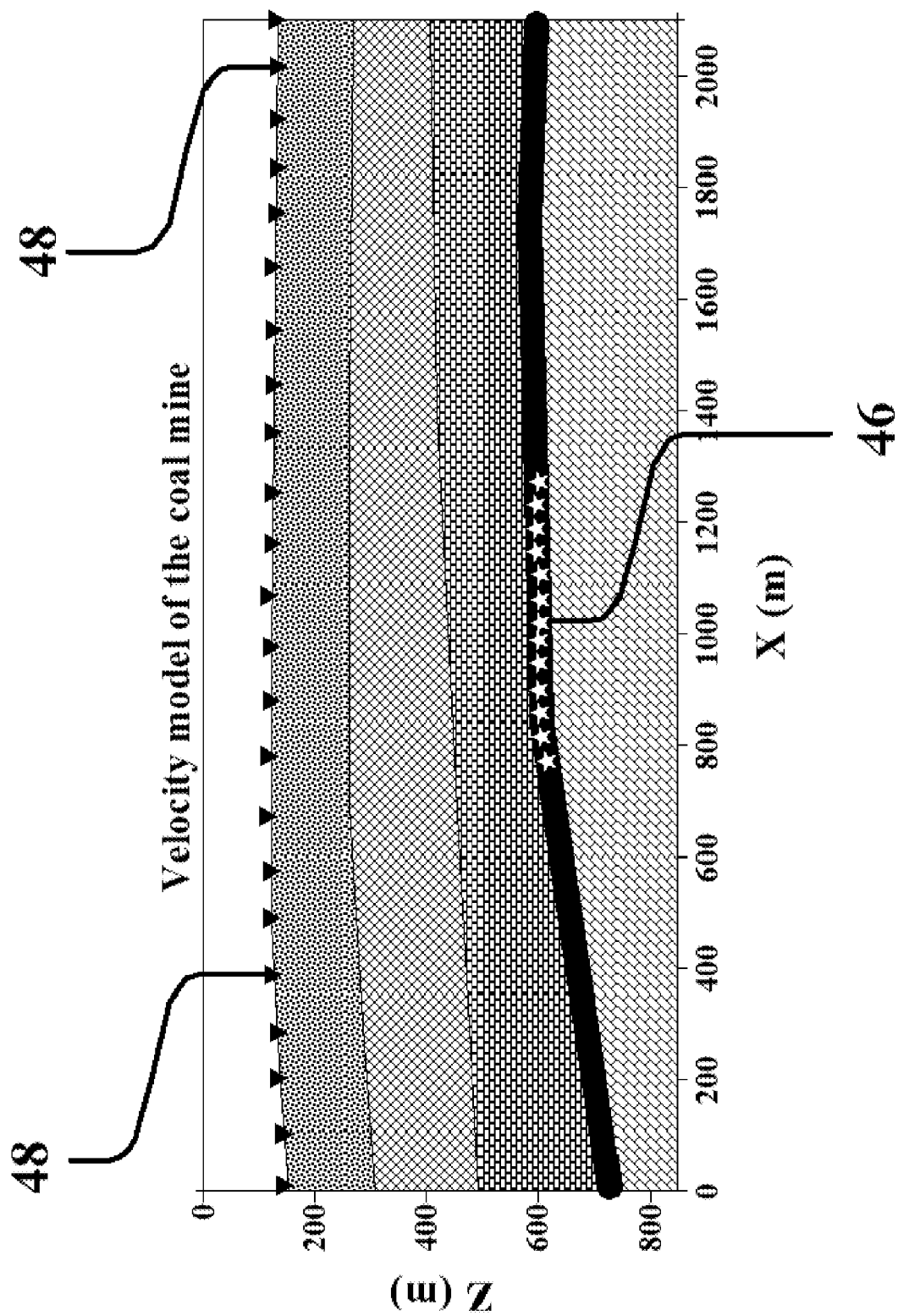
FIG. 3 is a velocity model for the mineshaft embedded in a layered medium, in accordance with an embodiment of the present invention. Stars indicate base station locations and geophone symbols are on top surface.

The method further includes identifying the location of a second seismic signal generated at any particular base station by miners trapped underground in an emergency. The second seismic vibration can be generated in a similar fashion as the first, either by repeatedly striking the strike plate with a hammer, activating a seismic vibrator, or by using some other method for generating a strong seismic vibration. In either case, a clean Green's function (i.e., low S/N ratio), as shown in FIG. 3, is recorded and archived for future use as a calibration shot gather. The reference Green's functions are correlated in the space-time domain with the signals from the miners. The Green's function that correlates at maximum amplitude with the recorded miner's signal indicates the location of the miner's base station. As such, a calibration shot gather can be created for each separate base station. The correlation operation is mathematically known as cross-correlation and the maximum amplitude of correlation is found for trial time shifts in the data as well as for Green's functions at trial base stations. The location of the base station, and therefore the location of the miners, can be accomplished by comparing the second seismic signal with the plurality of recorded baseline seismic signatures until the second seismic signal is found to cross-correlate with one of the reference signatures. This method can overcome the weak signal-to-noise ratio of the man-made seismic emissions in comparison to the other seismic activity going on in the mine, such as rockbursts, roof collapses or even ongoing mining operations with heavy machinery. As rock conditions can vary over time, in one embodiment, the method can include re-calibration of one or more base stations. The recommended frequency of recalibration depends on the mine, for a rapidly increasing mine, recalibration needs to be more frequent than a slowly increasing mine. On average, base stations could be recalibrated every couple of months with good accuracy.

Another embodiment of the present invention includes the method of creating a permanent seismic monitoring system above an underground mine to locate trapped miners. The method includes the operation of forming an array of seismic sensors on or near the surface of the earth directly above the underground mine. The array can comprise a central computer having data processing and data storage, and a plurality of surface seismic sensors. The surface seismic sensors can include geophones, seismometers, accelerographs or any instrument(s) capable of measuring seismic waves. Each surface seismic sensor can be separated from the nearest adjacent sensor by an array spacing distance, and can include a communications link to the central computer. Furthermore, each sensor location in the seismic array can include an individual seismic sensor placed or buried that each location, or a string of seismic sensors mounted vertically within a well-bore and extending some distance below the surface of the earth to increase the signal-to-noise ratio between the seismic emission and a background noise.

The method further includes the operation of constructing a plurality of base stations within the underground mine, where each base station is separated from the nearest adjacent base station by a base station spacing distance, and where each base station includes a strike plate, a hammer, a seismic vibrator, and/or any other device capable of generating a repeatable seismic vibration.

The method further includes the operation of recording a baseline or reference seismic signature for each of the underground base stations. This can be accomplished for each of the base stations by generating a repeating seismic emission from each of the base stations, for instance, by repeatedly striking the strike plate in a controlled manner, activating the seismic vibrator, etc. The seismic emission can be monitored with the array of surface seismic sensors to produce a plurality of seismic signals, which can then be communicated to the computer via each seismic sensor's communications link and processed into a unique seismic reference signature for that particular base station. This process can be replicated for each underground base station until a plurality of seismic reference signatures has been recorded.

The method of the present invention can further include the operation of processing each of the plurality of seismic signals to form the reference seismic calibration record, which were recorded at the different base stations. Reference seismic calibration record is also known as Green's function $G(x,t|x',0)$, wherein x' is a location for the base station, t is a listening time for a seismic signal started at time 0, and x is the location for the surface seismic sensors that produced the seismic signal. By combining, or stacking, all of the reference Green's functions received from each surface seismic sensor, a unique seismic reference signature can be recorded for the particular underground base station.

The method of the present invention can also include the operation of monitoring the array of surface seismic sensors with the central computer for a seismic emission that cross-correlates with the reference Green's function for one of the plurality of base stations. The monitoring can be continuous, or specific to the time immediately after a mine collapse or rockburst that could trap miners. As the surface seismic sensors are already in place and the reference Green's function recorded, there is no time lost in transporting the seismic system to the mine site or installing the sensors on the surface above the mine.

Figures 2A, 2B:
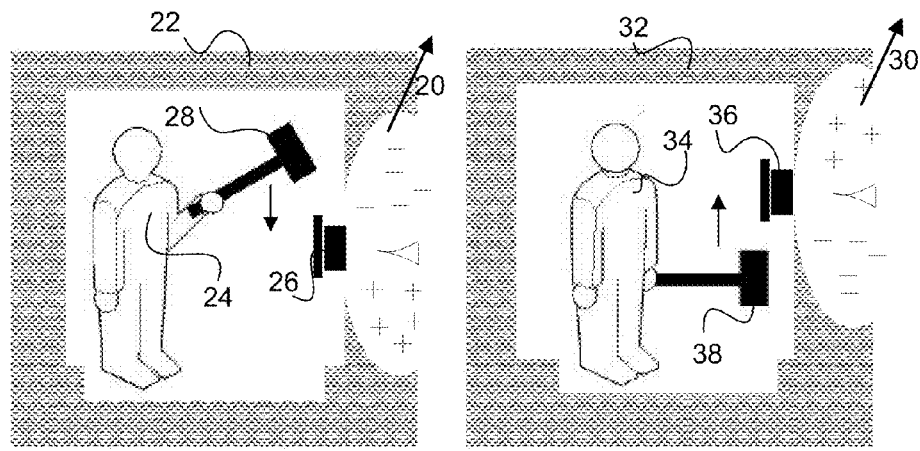
FIG. 2a and FIG. 2b are illustrations of the generation of positive and negative polarity seismic waves, respectively, as utilized by one exemplary embodiment of the present invention.

The method of the present invention can further include the operation of generating a seismic emission from the base station that includes an encoded message, in a manner that allows the trapped miners to communicate critical information to rescuers located on the surface. One aspect of the present invention includes sending the encoded message through of a series of reverse polarity pulses using a form of code, such as Morse code. As shown in FIG. 2a and FIG. 2b, seismic waves 20, 30 traveling through surrounding rock 22, 32 can have a polarity, depending on the manner in which the wave is initiated. In the case of trapped miners 24, 34 hitting a strike plate 26, 36 with a hammer 28, 38 creates a polarity pulse. As shown in FIG. 2a, when the hammer 28 is used to hit the strike plate 26 in a downward fashion, the negative polarity pulse 20 can be formed. On the contrary, a positive polarity pulse 30 can be formed by striking in an upward manner, as shown in FIG. 2b. Having the capability of controlling the polarity of the seismic signal increases the amount of information that can be communicated to the surface by the miners. Procedures and directions for generating seismic signals for having an encoded message can be stored at each base station location.

The method of the present invention can also include the operation of constructing one or more underground base stations with the highly advantageous capability of receiving a seismic communication from the surface of the earth. The method includes installing a number of surface seismic vibrators proximate to the surface of the earth above the underground mine. The surface seismic vibrators can be positioned at the same location of the surface seismic sensors, or in the alternative, at locations separate from the surface seismic sensors. The method further includes the operation of installing an underground seismic sensor at the base station configured to receive the surface communication, and operatively coupling the underground seismic sensor to a portable computing device, such as a laptop computer. As there is not likely to be a power source at the base station during an emergency, both the underground seismic sensor and the portable computing device can be configured with a self-contained power supply, such as a battery or a hand-crank generator.

The method can further includes the operation of activating the surface seismic vibrators using a reverse reference Green's function to create a surface-generated encoded message that is receivable at the underground base station, monitoring the underground seismic sensor with the portable computing device for the surface-generated encoded message, and translating the surface-generated encoded message with the portable computing device to produce an un-encoded message. Using the above-outlined procedure, therefore, a simple but robust bidirectional communications link can be established between miners trapped underground in an isolated location and rescuers on the surface. The link does not require underground cabling or a power source, as both are likely to be lost or cut-off in a roof collapse or rockburst, but instead uses seismic waves traveling through the layers of rock overlying the underground mine. The seismic waves can be generated by hand or by a seismic vibrator having a self-contained power source.

Figure 4:
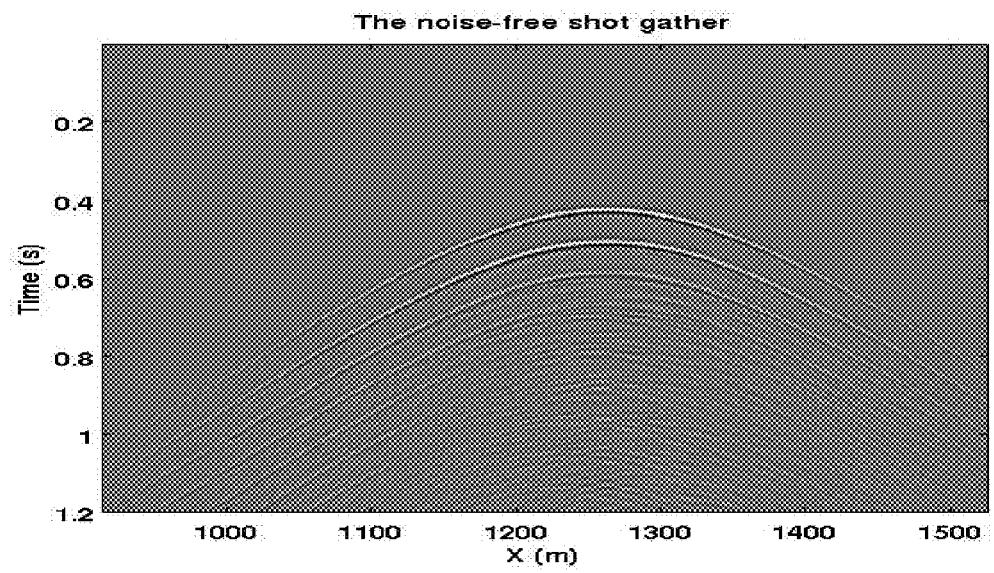
FIG. 4 is a clean Green's function, or shot gather recorded for a shot at one of the base stations in the mine, in accordance with an embodiment of the present invention.
Figure 5:
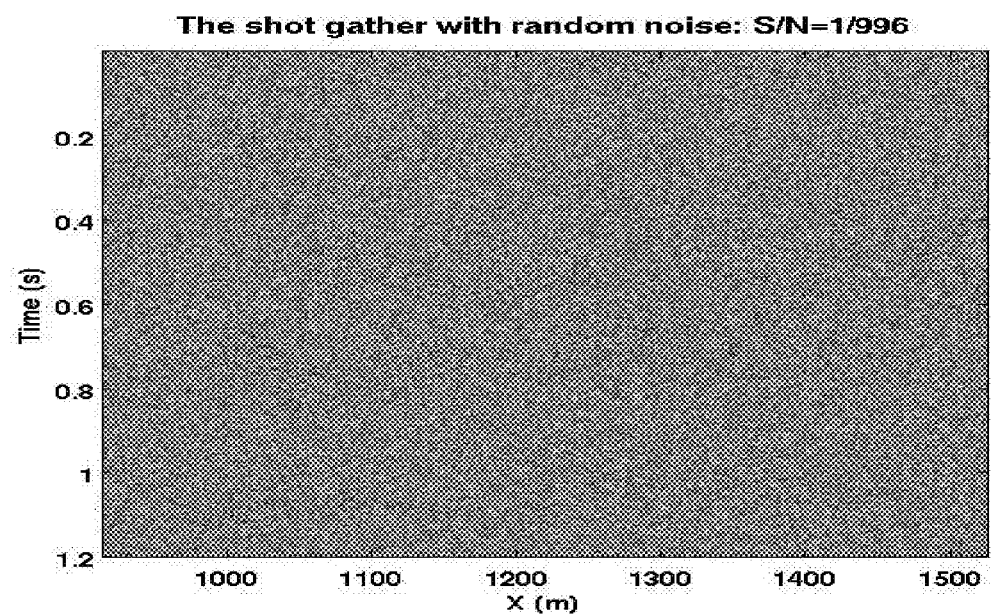
FIG. 5 is a shot including random noise for use with the clean shot of FIG. 4, in accordance with an embodiment of the present invention.
Figure 6:
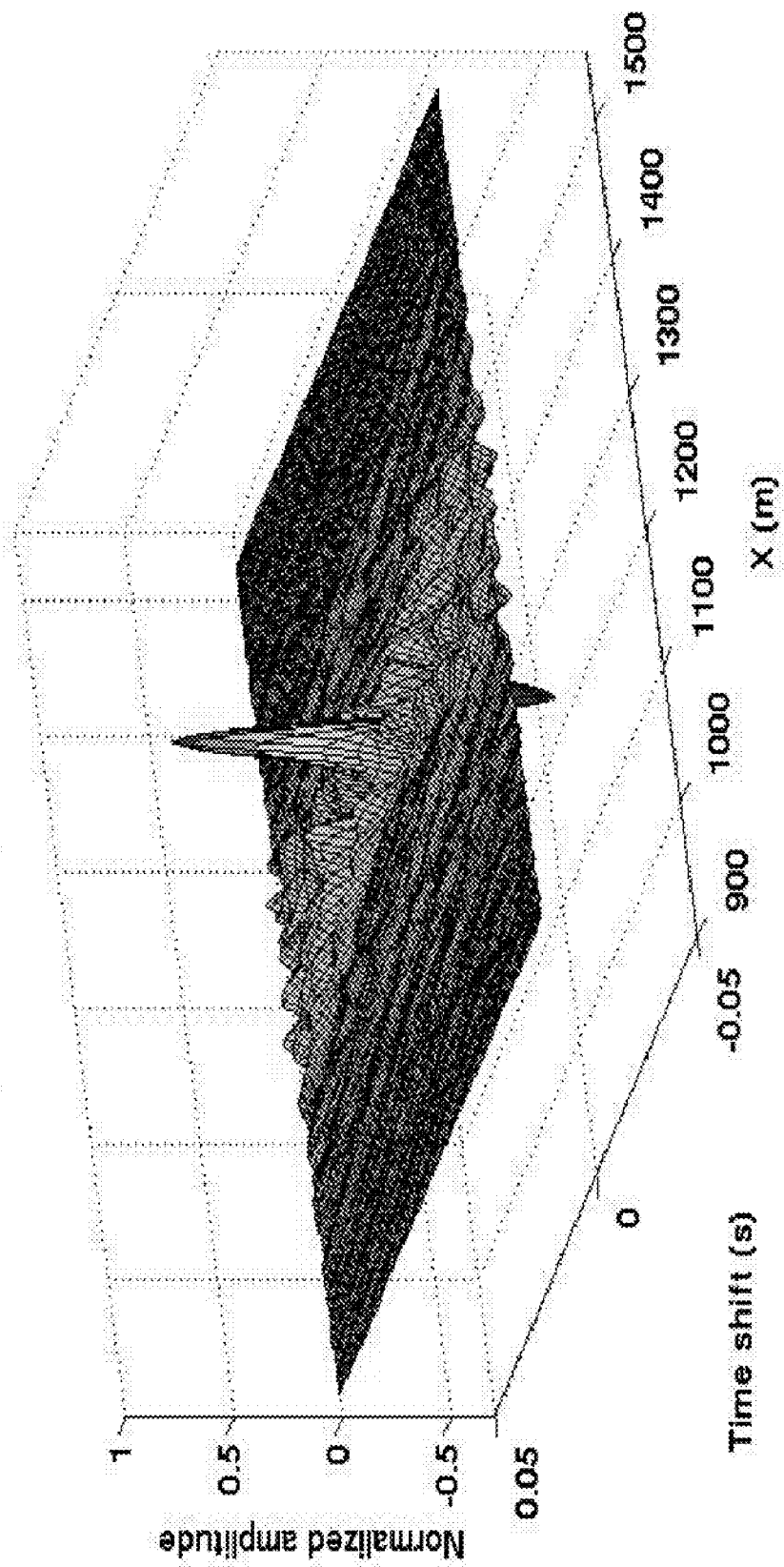
FIG. 6 is a correlation graph obtained by cross-correlating the clean Green's functions for different offset values X (i.e., base station locations) along the mine shaft and trial excitation times of the miner's hammer bang, in accordance with an embodiment of the present invention. The third axis is the correlation (i.e., migration) amplitude. The location of the miner and his excitation time are correctly indicated by the "X" and "Time shift" values at the peak normalized amplitude.

Numerical tests with computerized simulations were conducted to validate the system and method presented above. FIG. 3 depicts a computerized model with the mineshaft, base stations 46 in the mine, and surface geophones 48. A finite-difference solution to the wave equation is used to generate simulated data recorded on the surface for a point source at each of the buried base stations in the mine. An example of a resulting "clean Green's function" shot gather is shown in FIG. 4. Random noise is added to the traces to give the noisy shot gather shown in FIG. 5 for one of the base stations. The signal-to-noise (S/N) ratio here is 0.001 and is considered very poor. These noisy records were correlated with the "clean Green's functions" to locate the miner. FIG. 6 shows the graph of the correlated signals, which correctly indicates that the miner is located along the central part of the mineshaft and strikes his hammer at about the time of zero seconds.

Of course, it is to be understood that the above-described arrangements, and specific examples and uses, are only illustrative of the application of the principles of the present invention. Numerous modifications and alternative arrangements may be devised by those skilled in the art without departing from the spirit and scope of the present invention and the appended claims are intended to cover such modifications and arrangements. Thus, while the present invention has been described above with particularity and detail in connection with what is presently deemed to be the most practical and preferred embodiments of the invention, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. A method of creating a permanent seismic monitoring system above an underground mine to locate trapped miners, the method comprising:
    forming an array of seismic sensors proximate to a surface of the earth above the underground mine, the array comprising:
        a central computer having data processing and data storage; and
        a plurality of surface seismic sensors, wherein at least one of the plurality of surface seismic sensors is separated from an adjacent sensor by an array spacing distance, and wherein the at least one surface seismic sensor includes a communications link to the computer;
    constructing a plurality of base stations within the underground mine, wherein at least one of the plurality of base stations is separated from an adjacent base station by a base station spacing distance, and wherein the at least one base station includes a seismic generator; and
    recording a plurality of reference seismic signatures for the plurality of base stations where at least one reference seismic signature is recorded for each of the plurality of base stations by:
        producing a seismic emission from at least one of the plurality of base stations by actuating the seismic generator;
        sensing the seismic emission with the plurality of surface seismic sensors to form a plurality of seismic signals;
        communicating the plurality of seismic signals to the computer; and
        processing the plurality of seismic signals with the computer into at least one seismic reference signature for the at least one base station.

2. The method of claim 1, wherein processing the at least one seismic reference signature comprises recording a reference Green's function $G(x,t|x',0)$, wherein x' is a location for the at least one base station, t is a listening time for a seismic signal started at time 0, and x is a location for at least one of the plurality of seismic sensors.

3. The method of claim 1, wherein forming an array of surface seismic sensors further comprises positioning at least one vertical string of a plurality of seismic sensors in a well to increase a signal-to-noise ratio between the seismic emission and background noise.

4. The method of claim 1, further comprising miners trapped in an emergency moving to at least one of the plurality of base stations and generating a present seismic emission.

5. The method of claim 4, wherein the seismic generator is a strike plate and hammer and the present seismic emission is generated by repeatedly striking the strike plate of the at least one base station with the hammer.

6. The method of claim 4, wherein the seismic generator is a seismic vibrator and the present seismic emission is generated by activating the seismic vibrator.

7. The method of claim 4, further comprising monitoring the array of surface seismic sensors with the central computer for the present seismic emission that cross-correlates with the reference Green's function for the least one base station.

8. The method of claim 4, wherein generating the present seismic emission further comprises sending an encoded message from the at least one base station, and wherein the encoded message includes a series of reverse polarity pulses.

9. The method of claim 8, wherein a positive polarity pulse is formed by striking a strike plate in an upward manner, and a negative polarity pulse is formed by striking the strike plate in a downward manner.

10. The method of claim 2, wherein constructing a plurality of base stations further comprises enabling a reception of a seismic communication from the surface of the earth above an underground mine to at least one of the plurality of base stations.

11. The method of claim 10, wherein the enabling the reception of the seismic communication from the surface of the earth above the underground mine comprises:
    installing a plurality of surface seismic vibrators proximate to the surface of the earth above the underground mine;

installing an underground seismic sensor at the at least one base station, wherein the underground seismic sensor is operatively connected to a portable computing device;

activating the plurality of surface seismic vibrators using a reverse reference Green's function to create a surface-generated encoded message receivable at the at least one base station;

monitoring the underground seismic sensor with the portable computing device for the surface-generated encoded message; and translating the surface-generated encoded message with the portable computing device to produce an un-encoded message.

12. The method of claim 11, wherein at least one of the plurality of surface seismic vibrators is installed at a location of at least one of the plurality of surface seismic sensors.

13. A method of determining a location of miners trapped in an underground mine comprising:

recording a baseline seismic signature caused by a first seismic signal generated least one of a plurality of underground base stations; and identifying a location of a second seismic signal generated at the at least one base station in an emergency by using the recorded baseline seismic signature to overcome a weak signal-to-noise ratio.

14. A system for determining a location of miners trapped in an underground mine comprising:

an array of seismic sensors proximate to a surface of the earth above the underground mine, the array comprising;

a central computer having data processing and data storage; and a plurality of surface seismic sensors arranged in an array, wherein at least one of the plurality of surface seismic sensors is separated from an adjacent sensor by an array spacing distance, and wherein the at least one surface seismic sensors includes a communications link to the central computer;

a plurality of base stations within the underground mine, wherein at least one of the plurality of base stations is separated from an adjacent base station by a base station spacing distance, and wherein the at least one base station includes a seismic generator; and a plurality of reference seismic signatures for the plurality of base stations where at least one reference seismic signature is recorded for each of the plurality of base stations.

15. The system of claim 14, wherein the array of seismic sensors includes at least one vertical string of a plurality of seismic sensors in a well configured to increase a signal-to-noise ratio between a seismic emission and a background noise.

16. The system of claim 14, wherein the array of seismic sensors are configured for a depth resolution of up to about 300 meters.

17. The system of claim 14, wherein the seismic generator includes a strike plate and hammer.

18. The system of claim 14, wherein the seismic generator includes a seismic vibrator.

19. The system of claim 14, further comprising:

a plurality of surface seismic vibrators proximate to the surface of the earth above the underground mine;

an underground seismic sensor at the at least one base station; and a portable computing device operatively connected to the underground seismic sensor.

\* \* \* \* \*